United States Patent
Cappello et al.

(12) 
(10) Patent No.: US 6,416,449 B1
(45) Date of Patent: Jul. 9, 2002

(54) DEVICE FOR CHANGING BENDING TOOLS

(76) Inventors: Serge Cappello, Chemin de Rosette, Taluyers (FR), 69440; Jean-Paul Bruyas, 22 rue Ayasse, Lyon (FR), 69007; Jean-Paul Chastan, 38 cours des Sources, Ecully (FR), 69130

( * ) Notice: Subject to any disclaimer, the term of this patent is extended or adjusted under 35 U.S.C. 154(b) by 0 days.

(21) Appl. No.: 09/787,696
(22) PCT Filed: Sep. 21, 1999
(86) PCT No.: PCT/FR99/02235
§ 371 (c)(1), (2), (4) Date: May 21, 2001
(87) PCT Pub. No.: WO00/16922
PCT Pub. Date: Mar. 30, 2000

(30) Foreign Application Priority Data

Sep. 22, 1998 (FR) .............................. 98 11981

(51) Int. Cl.$^7$ .............................. B23Q 3/155
(52) U.S. Cl. .............................. 483/29; 483/44; 483/59; 483/902
(58) Field of Search .............................. 483/28, 29, 44, 483/59, 51, 48, 41, 40, 13; 72/442, 446

(56) References Cited

U.S. PATENT DOCUMENTS

| | | | | |
|---|---|---|---|---|
| 3,808,856 A | * | 5/1974 | Lance | 72/149 |
| 4,355,525 A | * | 10/1982 | Carson | 72/149 |
| 4,599,786 A | | 7/1986 | Uhtenwoldt | 483/14 |
| 4,649,622 A | * | 3/1987 | Scott | 483/29 |
| 4,967,585 A | * | 11/1990 | Grimaldo | 72/389.8 |
| 4,996,861 A | * | 3/1991 | Kellum | 72/144 |
| 5,407,415 A | * | 4/1995 | Spishak | 483/41 |
| 5,735,782 A | * | 4/1998 | Berg | 483/1 |
| 5,979,204 A | * | 11/1999 | Strange | 72/159 |
| 6,254,317 B1 | * | 7/2001 | Chang | 409/212 X |

FOREIGN PATENT DOCUMENTS

| | | | | |
|---|---|---|---|---|
| EP | 0120336 | | 3/1984 | |
| FR | 2668730 | * | 5/1992 | 483/56 |

* cited by examiner

Primary Examiner—William Briggs
(74) Attorney, Agent, or Firm—Dowell & Dowell, P.C.

(57) ABSTRACT

A grasping device for changing bending tools on tube bending machines which includes a frame mounted over the bending machine. The grasping device includes a rotary head having independent movements in rotation, vertical motion and horizontal motion. A tool magazine is also movably carried by the portal frame independently of the rotary head.

11 Claims, 4 Drawing Sheets

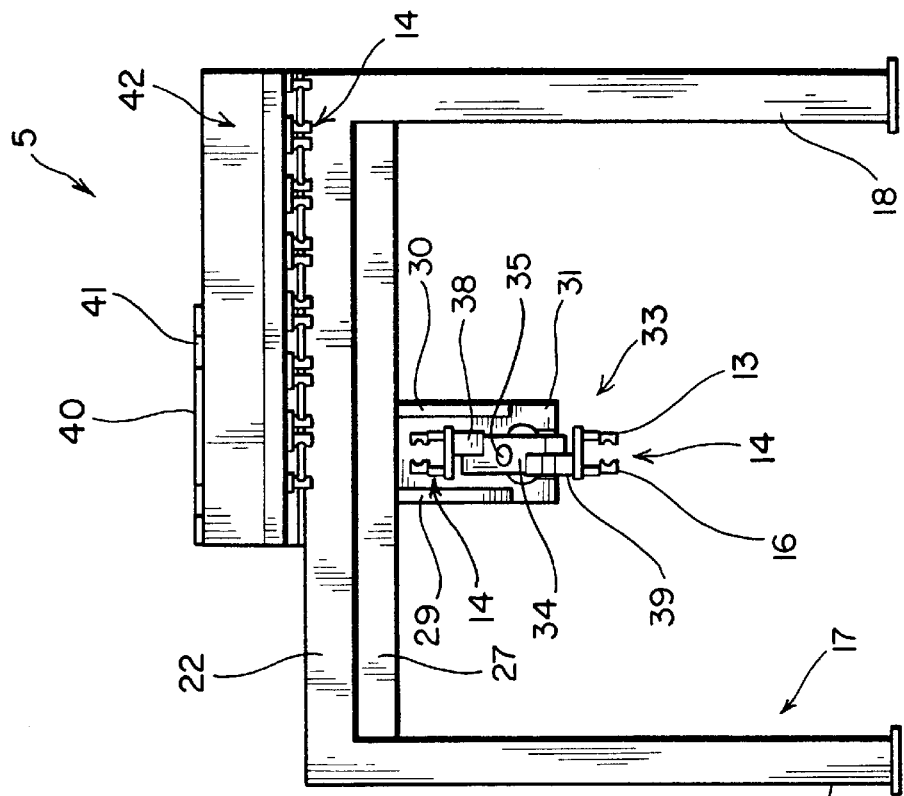
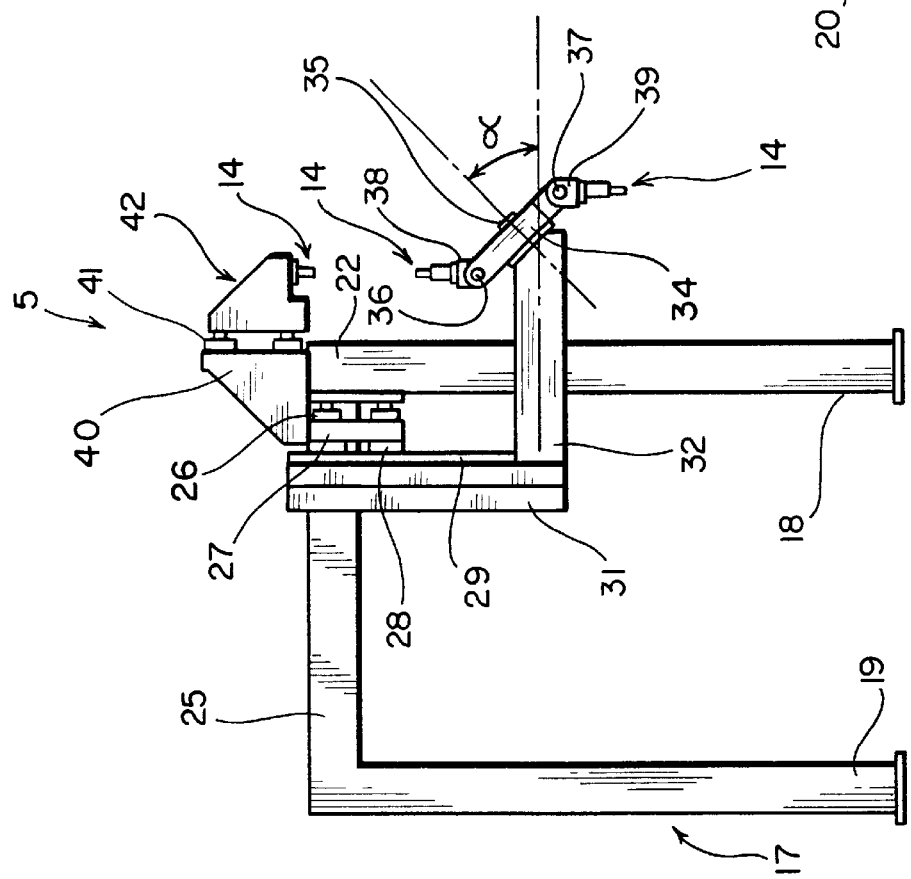

DEVICE FOR CHANGING BENDING TOOLS

BACKGROUND OF THE INVENTION

The present invention relates to a grasping device for changing the bending tools on a tube bending machine of standard type.

DESCRIPTION OF THE PREFERRED EMBODIMENT

Patent EP-0 120 336 discloses a tube bending machine which is secured on its bending jig, to a support device which merely allows the clamping jaws to be changed by a combination of vertical and horizontal movements over said bending jig.

The machine described in patent EP-0 120 336 has cycle times for performing tool changes which are too long and which slow down the production of elbows or bends in the tubes. What is more, the support device does not allow the simultaneous changing of the clamping jaws or mating jaws which correspond, respectively, to the moving jaw and to the fixed jaw of a standard tube bending machine.

To solve this problem, the applicant filed a patent application FR 98/01,315, which describes a tube bending machine comprising a barrel-type device the purpose of which was to bring the sets of clamping jaws comprising cavities of different shapes level with the bending head of the machine so that the one that corresponded to the exterior profile of the tube that was to be bent could be selected simply by rotating the barrel-type device about its longitudinal axis.

The tube bending machine (described in patent application FR 98/01,315) is secured on the bending arm to the barrel-type device carrying the sets of clamping jaws with different cavities. Each set of clamping jaws consists of a fixed jaw and a moving jaw making it possible to make an elbow, of a particular bend radius. The barrel-type device can pivot at the same time as the bending arm about the bending head so as to shape the tube.

Furthermore, the barrel-type device can move, on the one hand in rotation about its own longitudinal axis and, on the other hand, in directions contained in planes perpendicular and/or parallel to the one containing the longitudinal axis of the fixed frame.

SUMMARY OF THE INVENTION

The grasping device according to the present invention is intended to fit around a tube bending machine of standard type without modifying its structure and operation.

The grasping device is not secured to the bending head of the bending machine but is independent and placed around the latter so that during the time of the tube bending cycle it can change the tool or the sets of clamping jaws.

Grasping device for changing the bending tools on a tube bending machine of standard type, characterized in that it comprises:

a portal frame or the like placed around the bending machine over the bending head and bending arm;

a rotary head which, with respect to the portal frame has independent movements which consist of two independent or dependent rotations in different planes, a vertical movement, and a horizontal movement;

and a tool magazine which can move independently of the movements of the rotary head in a horizontal or rotary direction with respect to the portal frame.

Grasping device, characterized in that the rotary head pivots about a central axle which is inclined by an angle α with respect to a horizontal plane.

Grasping device, characterized in that the angle α is 45° with respect to a horizontal plane.

Grasping device, characterized in that the portal frame consists of four vertical legs connected together at the upper part by four horizontal beams which are arranged in such a way that one of the beams carries the rotary head and the tool magazine.

Grasping device, characterized in that the horizontal beam is secured to guide means which collaborate with a crossmember parallel to same beam and able to move in a horizontal direction with respect to the portal frame, said crossmember comprising, on its opposite side to the one that collaborates with the guide means, a guide device which allows a support to move in a vertical direction with respect to the portal frame, said support being secured, at right angles to its vertical axle and in its lower part, to a horizontal beam which, at its free end, carries the rotary head constituting the means of grasping the tools or sets of clamping jaws.

Grasping device, characterized in that the rotary head consists of an arm which can rotate about the central axle which is secured to the horizontal beam of the support.

Grasping device, characterized in that the arm is secured at each of its ends to a pivot axle each of which collaborates with a fixing device pivoting about its respective axle to move into a vertical plane parallel to the one containing the support.

Grasping device, characterized in that each fixing device is designed to carry a set of clamping jaws which consists of a moving jaw and a fixed jaw indexed respectively on the intermediate element of the jaw support secured to the bending arm and on the bending roller of the bending head of the bending machine.

Grasping device, characterized in that the arm is secured at each of its ends to a pivot axle which is arranged in a horizontal plane parallel to the one containing the beam.

Grasping device, characterized in that the horizontal beam is secured, above the guide means, to a horizontal crossmember equipped with guide means allowing the tool magazine to slide or rotate.

BRIEF DESCRIPTION OF THE DRAWINGS

The description which will follow with reference to the appended drawings given by way of nonlimiting example will allow a better understanding of the invention, of the characteristics it has and of the advantages it is likely to afford:

FIG. 4 is a side view depicting the device for changing tools according to the invention.

FIG. 5 is a front view illustrating the grasping device for changing the bending tools according to the present invention.

DESCRIPTION OF THE PREFERRED EMBODIMENT

Figure 1:
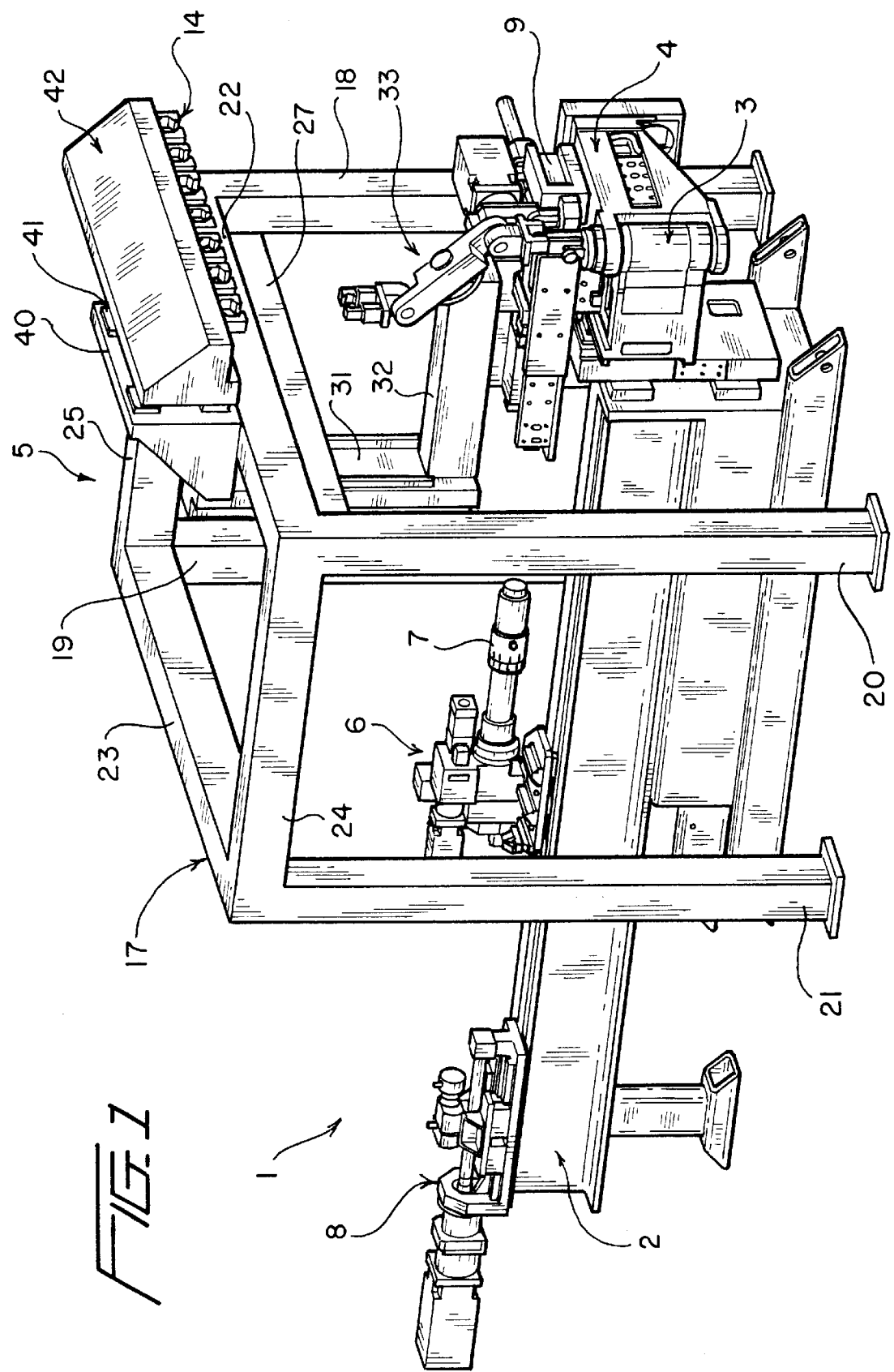
FIG. 1 is a perspective view illustrating a tube bending machine of standard type around which there is grasping device for changing the bending tools according to the present invention.
Figure 2:
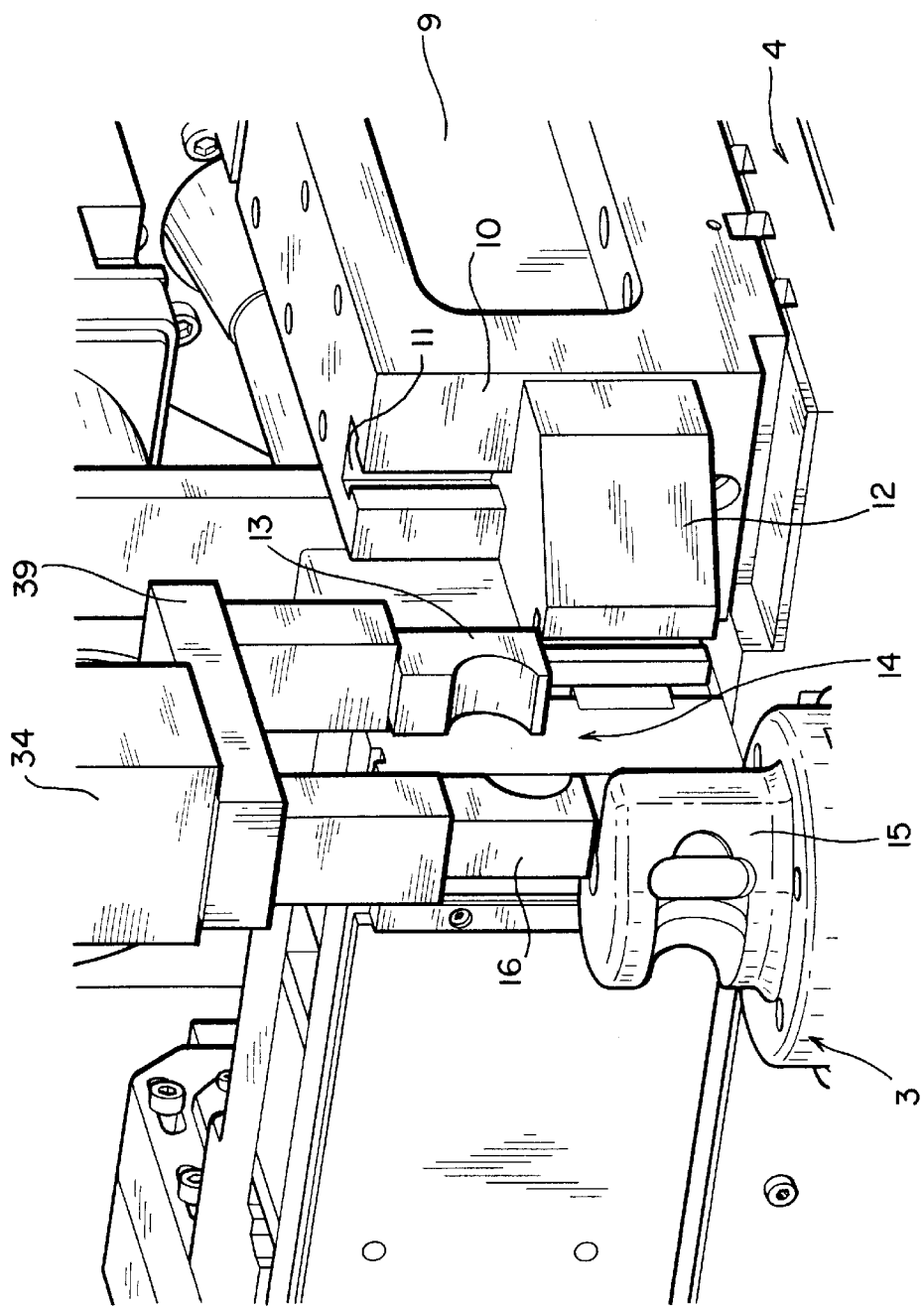
FIG. 2 is a detailed depiction of the bending head of the machine above which a set of clamping jaws carried by the grasping device according to the present invention is mounted.

FIGS. 1 and 2 show a bending machine 1 of standard type comprising a fixed frame 2 which at one of its ends carries a bending head 3 about which a bending arm 4 pivots, and a grasping device 5 for changing the bending tools which is arranged above said machine and level with the bending head 3.

The fixed frame 2 comprises, in the known way, and along its longitudinal axis, a guide rail on which there slides a carriage 6 which moves toward and away from the bending head 3.

The carriage 6 carries a mandrel 7 for holding and guiding a tube to be bent, not depicted, which is moved in translation and in rotation about its axis.

A device 8 also slides along the longitudinal rail of the fixed frame 2 to prevent, using an olive. the tube from being crushed while it is being bent.

The bending arm 4 comprises a jaw support 9 which moves horizontally in the direction of the bending head 3 via hydraulic or pneumatic or electrical devices known per se.

The jaw support 9 has, on its vertical edge 10 facing the bending head 3, a slot 11 in the shape of a T or the like, designed to take an intermediate element 12 intended to collaborate with the moving jaw 13 of the set of clamping jaws 14.

The bending head 3 is secured to a bending roller 15, or shaping roller, to which the fixed jaw 16 of the set of clamping jaws 14 is fixed.

The bending roller 15 has a circular profile, part of which is cut out to form a L-shaped cutout allowing the fixed jaw 16 of the set of clamping jaws 14 to be fitted.

Also, the bending roller 15 comprises, as is known, a peripheral groove which communicates with the cavity of the fixed jaw 16, and the bend radius of which can vary according to the shape that the tube is to be given.

The bending head 3 comprises movement means so that it can move horizontally and vertically with respect to the fixed frame 2, that is to say in directions in planes perpendicular to the one containing the longitudinal axis of the machine 1 or of the fixed frame 2.

The grasping device 5 for changing the bending tools or sets of clamping jaws 14 is placed around and over the bending machine 1.

Figure 3:
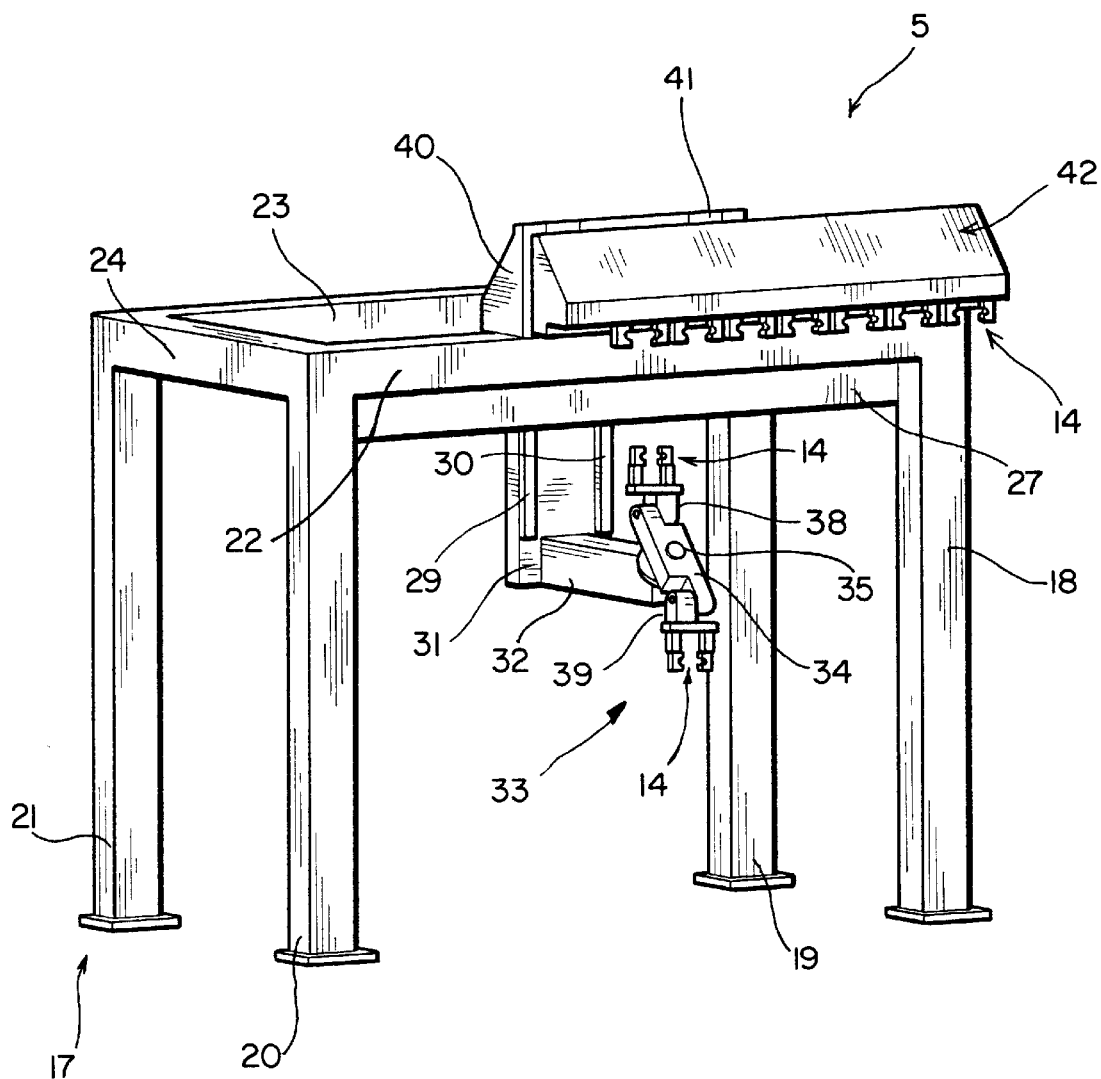
FIG. 3 is a perspective view showing the grasping device for changing the bending tools according to the invention.

FIGS. 3 to 5 show the grasping device 5 which consists of a portal frame 17 or the like with four vertical legs 18 to 21 connected together in the upper part of the portal frame 17 by horizontal beams 22 to 25. It is obvious that the portal frame 17 can be replaced by any other equivalent structure without in any way changing the subject-matter of the invention.

The horizontal beam 22 of the portal frame 17 is secured, inside the space defined by the horizontal beams 22 to 25, to guide means 26 which collaborate with a crossmember 27 parallel to said beam 22 and capable of moving in a horizontal direction with respect to said portal frame.

On its opposite face to the face collaborating with the guide means 26, the crossmember 27 has a guide device 28 which is connected to vertical and parallel guides 29 and 30 secured to a support 31 so that the latter can move in a vertical direction with respect to the portal frame 17.

The support 31 is secured, perpendicular to its vertical axis and in the lower part, to a horizontal beam 32, which, at its free end, carries a rotary head 33 constituting the means for grasping the tools or sets of clamping jaws 14.

The rotary head 33 consists of an arm 34 which can rotate about a central axle 35 which is secured to the horizontal beam 32 of the support 31. The central axle 35 is inclined by an angle α of about 45° with respect to the horizontal plane containing the beam 32.

The inclination of the rotation axle 35 allows the arm 34 of the rotary head 33 to be arranged in a plane that is inclined with respect to the horizontal plane of the beam 32.

This inclination of the rotary head 33 by an angle α frees up a significant volume around the bending head 3 of the machine 1, making it possible to create space for handling the already bent tube without the latter butting against the rotary head.

The arm 34 is secured at each of its ends to a pivot axle 36, 37 which is arranged in a horizontal plane parallel to the one containing the beam 32.

Each axle 36, 37 collaborates with a fixing device 38, 39 which can pivot about its respective axle 36, 37 to move into a vertical plane parallel to the one containing the support 31.

Each fixing device 38, 39 carries a set of clamping jaws 14 which consists of a moving jaw 13 and a fixed jaw 16 which are designed to be indexed respectively on the intermediate element 12 of the jaw support 9 secured to the bending arm 4 and on the bending roller 15 of the bending head 3 of the bending machine 1 (FIG. 2).

The horizontal beam 22 of the portal frame 17 is secured, above the guide means 26, to a horizontal crossmember 40 provided with guide means 41 allowing a tool magazine 42 to slide or rotate parallel to the beam 22.

The tool magazine 42 comprises sets of clamping jaws 14 each set comprising a moving jaw 13 and a fixed jaw 16. The sets of clamping jaws 14 have cavities, the bend radii of which differ so as to allow the same bending machine 1 to perform a number of bending operations on one and the same tube.

The tool magazine 42 may also carry bending rollers 15 secured to the fixed jaw 16 constituting a monobloc tool and moving jaws 13 forming sets of clamping jaws 14.

The tool magazine 42 is controlled by a central unit, not depicted, which is independent of or identical to the one controlling the bending machine 1.

It is noted that the horizontal movements of the tool magazine 42 are independent of the combined horizontal and vertical movements that allow the rotary head 33 to move.

The independence of the movements of the tool magazine 42 and of the rotary head 33 makes it possible to reduce the cycle time for changing sets of clamping jaws 14 and, more particularly, allows the sets of clamping jaws 14 to be brought into position which takes place while the tube is being bent on the bending machine 1.

Note that the head 33 has combined movements which consist of two independent or dependent rotations in different planes, of a vertical movement with respect to the portal frame 17 by virtue of the movement of the support 31, and of a horizontal movement with respect to the portal frame 17 via the crossmember 27.

The operation of the grasping device 5 for changing bending tools with respect to a tube-bending cycle on the machine 1 will have been readily understood from the above description.

For example, it is possible to begin the bending cycle when the bending arm 4 of the machine 1 is at 0° with respect to the fixed frame 2, that is to say when it has returned to its origin after the tube has been bent, as shown in FIG. 1.

Thus, the bending arm 4 and, more particularly, the jaw support 9, carries, via the element 12, a moving jaw 13, whereas the bending roller 15 collaborates with a moving jaw 16 forming a first set of clamping jaws 14 which has allowed the tube to be bent.

The grasping device 5 presents the rotary head 33 over the bending head 3 and the bending arm 4 by means of a horizontal movement of the crossmember 27.

With a vertical movement of the support 31, the rotary head 33 is brought up close to the bending head 3 and bending arm 4.

The rotary head 33 offers up its fixing device 39 which is free and already positioned in a vertical direction by pivoting about the axle 37 over the moving jaws 13 and fixed jaws 16 of the first set of clamping jaws 14.

With a downward vertical movement of the support 31, the rotary head 33 collects the moving jaws 13 and fixed jaws 16 of the first set of clamping jaws 14 on its fixing device 39 by snap-fastening or any other similar means of fixing.

By vertical movement of the support 31 with respect to the portal frame 17 the rotary head 33 moves back up to extract the moving jaws 13 and fixed jaws 16 from the intermediate element 12 and from the bending roller 15.

The head 33 pivots about its central axle 35 by half a revolution to offer up a new set of clamping jaws 14 carried by the fixing device 38 over the bending head 3 and bending arm 4. This fixing device is placed in a vertical position by pivoting about its axle 36 so that the moving jaws 13 and fixed jaws 16 of the new set of clamping jaws 14 are in the same vertical plane as the bending head 3 and the bending arm 4.

The rotary head 33 is lowered via the support 31 to bring the new set of clamping jaws 14 and, respectively, the moving jaw 13 into the intermediate element 12 of the bending arm 4 and the fixed jaw 16 into the cutout of the bending roller 15 of the bending head 3.

The moving jaws 13 and fixed jaws 16 of the new set of clamping jaws 14 are unlocked from the fixing device 38 by pneumatic means or the like, not depicted, and separated from the fixing device 38 which is then free and has no sets of clamping jaws as the rotary head 33 is raised again.

At the same time as the new set of clamping jaws 14 is positioned on the bending machine 1, the magazine 42 moves horizontally along the beam 22 of the portal frame 17 to present an empty housing for accommodating the set of clamping jaws 14 on the axis of the rotary head 33 and, more particularly, facing the fixing device 39.

The rotary head 33 is raised vertically by means of the support 31 with respect to the portal frame 17, allowing the first set of clamping jaws 14 secured to the fixing device 39 to be placed in the selected empty housing in the magazine 42.

The rotary head 33 is lowered vertically via the support 31 to leave the sets of clamping jaws 14 in the magazine 42 and free the fixing device 39. The magazine 42 moves horizontally along the beam 22 again to offer up another set of clamping jaws 14 to the fixing device 39.

The rotary head 33 is raised up again to fix the other set of clamping jaws 14 on the device 39, while the fixing device 38 is free and has no tools.

At the same time as the rotary head 33 and the magazine 42 are moving to unload and load the sets of clamping jaws 14, the bending machine 1 proceeds with shaping an elbow in the tube using the set of clamping jaws positioned via the fixing device 38.

As soon as tube bending is complete, the set of steps described hereinabove are performed again, but this time starting with the fixing device 38 which is empty so that it can collect the set of clamping jaws 14 loaded onto the machine 1.

What is claimed is:

1. A grasping device for changing bending tools on a tube bending machine, the grasping device comprising:
   a portal frame (17) adapted to straddle over the bending machine (1) and over a bending head (3) and a bending arm (4) of the bending machine;
   a rotary head (33) which has, with respect to the portal frame (17), independent movements which consist of two rotational movements in different planes, a vertical movement, and a horizontal movement;
   and a tool magazine (42) mounted to said portal frame which is movable independently of the movements of the rotary head (33) in a horizontal and/or rotary direction with respect to the portal frame (17).

2. A grasping device according to claim 1, wherein the rotary head (33) pivots about a central axle (35) which is inclined by an angle ($\alpha$) with respect to a horizontal plane.

3. A grasping device according to claim 2, wherein the angle ($\alpha$) is approximately 45° with respect to a horizontal plane.

4. A grasping device according to claim 1, wherein the portal frame (17) consists of four vertical legs connected together at upper parts thereof by four horizontal beams (22,23,24,25) which are arranged in such a way that one of the beams (22) carries the rotary head (33) and the tool magazine (42).

5. A grasping device according to claim 4, wherein one of the horizontal beams is secured to guide means (26) which collaborate with a crossmember (27) parallel to the one beam (22) and able to move in a horizontal direction with respect to the portal frame (17), said crossmember (27) including, on a side opposite to the one side that collaborates with the guide means (36), a guide device (28) which allows a support (31) to move in a vertical direction with respect to the portal frame (17), said support (31) being secured, at right angles to its vertical axis and at a lower part thereof, to a horizontal beam (32) which, at a free end, carries the rotary head (33).

6. A grasping device according to claim 5, wherein the rotary head (33) includes an arm (34) which rotates about the central axle (35) which is secured to the horizontal beam (32).

7. A grasping device according to claim 6, wherein the arm (34) is secured at opposite ends thereof to pivot axles (36, 37) each of which support a fixing device (38, 39) such that the fixing devices are movable in a vertical plane parallel to a vertical plane containing the support (31).

8. A grasping device, according to claim 7, wherein each fixing device (38, 39) is adapted to carry a set of clamping jaws (14) which consists of a moving jaw (13) and a fixed jaw (16) such that the clamping jaws may be indexed respectively on an intermediate element (12) of a jaw support (9) secured to the bending arm (4) and on a bending roller (15) of the bending head (3) of the bending machine (1).

9. A grasping device according to claim 7, wherein the arm (34) is secured at its opposite ends to the pivot axles (36, 37) which are arranged in a horizontal plane parallel to a horizontal plane containing the beam (32).

10. A grasping device according to claim 4, wherein the one horizontal beam is secured, above a guide means (26), to a horizontal crossmember (40) equipped with guide means (41) allowing the tool magazine (42) to slide or rotate.

11. A grasping device according to claim 7, wherein each set of the clamping jaws (14) consists of a moving jaw (13) and of a monobloc tool formed of a bending roller (15) on which a fixed jaw (16) is carried.

* * * * *